United States Patent

Wong

[11] Patent Number: 4,722,974
[45] Date of Patent: Feb. 2, 1988

[54] NOVEL BLOCK COPOLYMERS CONTAINING BENZOCYCLOBUTENE UNITS

[75] Inventor: Pui K. Wong, Katy, Tex.

[73] Assignee: Shell Oil Company, Houston, Tex.

[21] Appl. No.: 812,423

[22] Filed: Dec. 23, 1985

[51] Int. Cl.$^4$ .................... C08F 297/02; C08F 297/04
[52] U.S. Cl. ...................................... 525/250; 525/289
[58] Field of Search ................................. 525/289, 250

[56] References Cited

U.S. PATENT DOCUMENTS

| | | | |
|---|---|---|---|
| 2,917,499 | 12/1959 | Cripps et al. | 260/93.1 |
| 3,366,616 | 1/1963 | Tietz | 260/93.1 |
| 3,470,137 | 9/1969 | Blanchard, Jr. | 260/78.5 |
| 3,497,483 | 2/1970 | Ketley | 260/79.5 |
| 3,523,928 | 8/1970 | Blanchard, Jr. | 260/80 |
| 3,594,452 | 7/1971 | DeLaMare et al. | 260/880 |
| 4,540,763 | 9/1985 | Kirchhoff | 526/281 |
| 4,642,329 | 2/1987 | Kirchhoff et al. | 526/284 |

OTHER PUBLICATIONS

Chemical Abstract 72653f; vol. 82, 1975.
Research Disclosure 268008.
Boekelheide et al., Tetrahedron Lett., 1978, 4245–8.
Boekelheide, Topics in Current Chem., 1983, 113, 100–4.
Perkins et al., Angew. Chem. Int. Ed. Engl., 1978, 17*8), 615–6.
Ewing et al., J. Chem. Soc., Chem. Commun., 1979, 207–8.
Gray et al., J. Am. Chem. Soc., 1978, 100, 2893–4.
Harruff et al., J. Am. Chem. Soc., 1978, 100, 2893–4.
Aalbersberg, Tetrahedron Lett., 1979, 22, 1939–42.
Hubert et al., J. Chem. Soc., 1965, 3160–9.

Primary Examiner—Wilbert J. Briggs, Sr.

[57] ABSTRACT

Novel, reactive block copolymers are claimed having the structures AB, ABA, $(AB)_m$, $(AB)_n$—Y—A)$_o$ and $(AB)_n$—Y—B)$_p$ where each A block is a copolymer block of a monoalkenyl arene monomer and a benzocyclobutene monomer of the formula

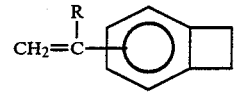

where R is H or CH$_3$ and each B block is a polymerized conjugated diene hydrocarbon block.

19 Claims, No Drawings

NOVEL BLOCK COPOLYMERS CONTAINING BENZOCYCLOBUTENE UNITS

FIELD OF THE INVENTION

The present invention is directed to novel block copolymers of monoalkenyl arenes and/or conjugated dienes. More particularly, the present invention is related to novel block copolymers of monoalkenyl arenes, conjugated dienes and derivatives of benzocyclobutene, which polymers may be crosslinked at elevated temperatures.

BACKGROUND OF THE INVENTION

Block copolymers have been developed rapidly within the recent past, the starting monomers usually being monoalkenyl arenes such as styrene or alphamethyl styrene block polymerized with conjugated dienes such as butadiene and isoprene. A typical block copolymer of this type is represented by the structure polystyrene-polybutadiene-polystyrene. When the monoalkenyl arene blocks comprise less than about 55% by weight of the block copolymer, the product is essentially elastomeric. Moreover, due to their peculiar set of physical properties they can be referred to more properly as thermoplastic elastomers. By this is meant polymers which in the melt state are processable in ordinary thermoplastic processing equipment but in the solid state behave like chemically vulcanized rubber without chemical vulcanization having been effected. Polymers of this type are highly useful in that the vulcanization step is eliminated and, contrary to scrap from vulcanized rubbers, the scrap from the processing of thermoplastic elastomers can be recycled for further use.

These block copolymer have enjoyed broad commercial success. Nevertheless, improvements in such polymers are desired. In particular, for particular applications such polymers require greater solvent resistance and higher use temperatures. Still further, such polymers also need improved adhesion to polar materials when used in certain blend compositions. What has now been discovered is a new block copolymer that overcomes these deficiencies.

SUMMARY OF THE INVENTION

The present invention relates broadly to novel copolymers of monoalkenyl arenes and/or conjugated dienes with a benzocyclobutene derivative. In particular, the present invention relates to a block copolymer selected from the group consisting of AB block copolymers, ABA block copolymers, $(AB)_{\overline{m}}Y$ block copolymers, $(AB)_{\overline{n}}Y(A)_o$ block copolymers, $(AB)_{\overline{n}}Y(B)_p$ block copolymers and mixtures thereof where each "A" is a copolymer block of a monoalkenyl arene monomer and a benzocyclobutene monomer of the formula

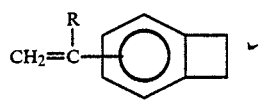

where R is H or CH$_3$, each "B" is a polymerized conjugated diene hydrocarbon block, "m", "n", "o" and "p" are each 1 to about 30 and Y is the residue of a multifunctional coupling agent or multifunctional initiator.

The invention also relates to a process for preparing such polymers.

ADVANTAGES OF THE INVENTION

The polymers of the present invention possess a number of advantages over prior art block copolymers. When the polymers of the present invention are crosslinked at elevated temperatures, the resulting polymers possess improved solvent resistance along with higher use temperatures. In addition, it is possible to functionalize such non-crosslinked polymers to obtain polymers having improved adhesion to polar materials.

DETAILED DESCRIPTION OF THE INVENTION

The block copolymers of the present invention have idealized structures as follows:

| Structure | Type |
|---|---|
| AB | 2 block copolymer |
| ABA | linear block copolymer |
| $(AB)_{\overline{m}}Y$ | radial block copolymer |
| $(AB)_{\overline{n}}Y(A)_o$ | assymetric radial block copolymer |
| $(AB)_{\overline{n}}Y(B)_p$ | assymetric radial block copolymer |

Mixtures of the above structures are also contemplated.

The "A" blocks are copolymer blocks of a monoalkenyl arene monomer and a benzocyclobutene monomer of the formula

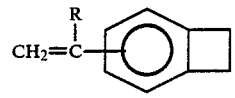

where R is H or CH$_3$. When R is H, the benzocyclobutene monomers are 4-vinylbenzocyclobutene or 3-vinylbenzocyclobutene. When R is CH$_3$, the benzocyclobutene monomers are 4-isopropenylbenzocyclobutene or 3-isopropenylbenzocyclobutene. The preferred benzocyclobutene monomer is 4-vinylbenzocyclobutene. Preferably the monoalkenyl arene is styrene. Other useful monoalkenyl arenes include alphamethyl styrene, tertbutyl styrene, paramethyl styrene and the other ring alkylated styrenes as well as mixtures of the same.

The relative amounts of benzocyclobutene monomer and monoalkenyl arene monomer in the A blocks depends upon the desired functionality or degree of crosslinks. The table below shows suitable ranges in mole percent:

|  | Preferred | More Preferred |
|---|---|---|
| Benzocyclobutene monomer | 0.01 to 20 | 0.1 to 10 |
| Monoalkenyl arene monomer | 99.99 to 80 | 99.9 to 90 |
| TOTAL | 100 | 100 |

The B blocks are polymer blocks of conjugated dienes. Preferred dienes include butadiene and isoprene. A much preferred diene is butadiene. Mixtures of conjugated dienes may also be employed.

The Y moiety stands for the residue of a multifunctional coupling agent. Linear polymers (ABA) are formed by employing coupling agents having two reactive sites or by sequential polymerization. One type of coupling agent employed in the forming linear polymers is a dihalo alkane such as dibromoethane. See G.B. Pat. No. 1,014,999. Another coupling agent employed in making linear polymers is phenyl benzoate as disclosed in U.S. Pat. No. 3,766,301. Radial polymers are formed by employing coupling agents having more than two reactive sites. Examples of such coupling agents include among others: SiCl4—U.S. Pat. No. 3,244,664; Polyepoxides, polyisocyanates, polyimines, polyaldehydes, polyketones, polyanhydrides, polyesters, polyhalides—U.S. Pat. No. 3,281,383; Diesters—U.S. Pat. No. 3,594,452; Methoxy silanes—U.S. Pat. No. 3,880,954; Divinyl benzene—U.S. Pat. No. 3,985,830; 1,3,5-benzenetricarboxylic acid trichloride—U.S. Pat. No. 4,104,332; and glycidoxy-methoxy silanes—U.S. Pat. No. 4,185,042.

The linear and radial block polymers may also be formed by sequential polymerization using multi-functional initiators having $\geq 2$ reactive carbon-lithium bonds. The dilithium initiators are represented by the formula LiRLi. Examples of these dilithium initiators are 1,1,6,6-tetraphenyl-1,5-hexadiene, 1,3-divinylbenzene, 1,3-bis(1-methylvinyl)benzene, 1,4-bis(2-phenylvinyl)benzene, 1,3-bis(1-phenylvinyl)benzene, 1,4-bis(1-phenylvinyl)benzene, 4,4'-bis(1-phenylvinyl)biphenyl, 2,7-diphenyl-1,7-octadiene, 2,7-di-4-tolyl-1,7-octadiene, 1,2-bis(4-(1-phenylvinyl)phenyl)-ethane, and 1,4-bis(4-(1-phenylvinyl)phenyl)butane. Initiators with more than two lithium-carbon bonds can be formed by the reaction of RLi and DVB.

The letters "m", "n", "o" and "p" stand for the relative number of arms in each polymer molecule. Accordingly, m, n, o and p are integers when referring to a single polymer molecule. However, a polymer mass will generally contain molecules of varying functionality. When referring to the polymer $(AB)_{\overline{m}}Y$, it is preferred that m be 1 to 15, preferable 2 to 8. When referring to the polymers $(AB)_{\overline{n}}Y-(A)_o$ and $(AB)_{\overline{n}}Y-(A)_p$, it is preferred that the sum of n+o be greater than 3, preferably 3 to 15 and that the sum of n+p be greater than 3, preferably 3 to 15. Accordingly n is preferably 2 to 8 for both polymers.

The polymers of the present invention are produced by anionic polymerization employing an organomonolithium initiator. (The following description refers only to mono-lithium initiators, though it is appreciated, as stated above, that multi-functional initiators may also be used.) The first step of the process involves contacting the monoalkenyl arene monomer benzocyclobutene monomer and the organomonolithium compound (initiator) in the presence of an inert diluent therein forming a living polymer compound having the simplified structure A-Li. The monoalkenyl arene is preferably styrene. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula $R^1Li$; wherein $R^1$ is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-75°$ to $+150°$ C. and at pressures which are sufficient to maintain the reaction mixture in the liquid phase.

Next, the living polymer in solution is contacted with a conjugated diene. Preferred dienes include butadiene and isoprene. A much preferred diene is butadiene. The resulting living polymer has a simplfied structure A—B—Li. The predominantly cis-1,4 microstructure of the polybutadiene blocks obtained from polymerization in cyclohexane can be modified to a random mixture of 1,4- and 1,2-structures by the addition of a small amount of ether modifiers such as $Et_2O$, THF, etc.

The B-Li polymer arms may be formed in a separate reactor employing an inert solvent, organomonolithium initiator and conjugated diene monomer. In an alternative embodiment, the B-Li arms may be formed in the same reactor as the AB-Li polymer arms. In that case, after the A-Li arms are formed, additional initiator is added. Then the conjugated diene monomer is added. In this alternative embodiment, the B arms and the B portion of the AB arms will necessarily be similar in composition and molecular weight.

The molecular weights of the living polymer arms (A and B) may vary between wide limits. Suitable number average molecular weights are:

|   | Preferred | More Preferred |
|---|---|---|
| A | 300 to 30,000 | 3,000 to 20,000 |
| B | 15,000 to 100,000 | 25,000 to 60,000 |

The living AB-Li and B-Li or A-Li polymer arms are then reacted with a multifunctional coupling agent. Exemplary coupling agents are listed above. The AB and ABA polymers do not require use of coupling agents.

The coupling agent should be aded to the living polymer after the polymerization of the monomers is substantially complete, i.e., the agent should only be added after substantially all of the monomer has been converted to living polymers.

The amount of coupling agent added depends upon the structure of the coupling agent and on the desired number of arms, and the choice is within the skill of the average polymers chemist.

The coupling reaction step may be carried out in the same solvent as for the polymerization reaction step. A list of suitable solvents is given above. The coupling reaction step temperature may also vary between wide limits, e.g., from 0° to 150° C., preferably from 20° to 120° C. The reaction may also take place in an inert atmosphere, e.g., nitrogen and under pressure e.g., a pressure of from 0.5 to 10 bars.

Following the coupling reaction, the polymer product may be hydrogenated according to copending application Ser. No. 812,424, now U.S. Pat. No. 4,687,815, or functionalized.

Then the product is typically recovered such as by coagulation utilizing hot water or steam or both.

A key aspect of the present invention is that the end product contains randomly distributed benzocyclobutene structures in the styrene end blocks. A schematic structure for an ABA block copolymer is shown below, where the monoalkenyl arene block is made from styrene (S) and the diene block is made from butadiene (B):

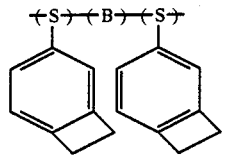

Accordingly, when such a polymer is molded at temperatures above about 200° C. (or otherwise heated above such temperatures), a crosslinked elastomer is obtained.

To illustrate the instant invention, the following illustrative embodiments are given. It is to be understood, that the embodiments are given for the purpose of illustration only and the invention is not to be regarded as limited to any of the specific materials or conditions used in the specific embodiments.

ILLUSTRATIVE EMBODIMENTS I

A key aspect of the present invention deals with the ring-opening of the benzocyclobutene monomers to reactive o-quinodimethanes. In this embodiment, half-life values for the parent benzocyclobutene are calculated and summarized in the following Table 1, based on activation parameters reported in W. R. Roth et al Chem. Ber. 111, 3892–3903 (1978). The results suggest that reactive oligomers and polymers containing benzocyclobutenes which are not substituted at the cyclobutene ring would have long shelf-life and good reactivity at 200°–250° C.

TABLE 1

Benzocyclobutene $\xrightarrow{k}$ o-quinodimethane

| T (°C.) | k (sec$^{-1}$) | t$_{\frac{1}{2}}$(hr) |
|---|---|---|
| 25 | 2.5 × 10$^{15}$ | 7.6 × 10$^{10}$ |
| 100 | 1.7 × 10$^{-9}$ | 1.1 × 10$^{5}$ |
| 150 | 9.6 × 10$^{-7}$ | 2 × 10$^{2}$ |
| 200 | 1.4 × 10$^{-4}$ | 1.4 |
| 250 | 7.8 × 10$^{-3}$ | 2.5 × 10$^{-2}$ |

ILLUSTRATIVE EMBODIMENT II

Preparation of 4-vinylbenzocyclobutene

A solution of 4-chloromethylbenzocyclobutene (24.4 g, 160 mmol) and triphenylphosphine (41.9 g, 160 mmol) in 120 ml of chloroform was heated at reflux for 24 h. Addition of diethyl ether followed by filtration gave tripheny(4-benzocyclobutenyl)methyl phosphonium chloride as a white powder: $^1$H NMR (CDCl$_3$) δ3.03 (m, 4H), 5.36 (d, 2H), 6.82 (m, 3H), 7.6–7.8 (m, 15H). To a solution of the phosphonium salt in 500 ml of 37% formaldehyde in water was added dropwise 75 ml of 50% aqueous sodium hydroxide. The mixture was stirred at ambient temperature for 2 h and then extracted with diethyl ether. The ether extract was washed with brine and dried over magnesium sulfate. Fractional distillation gave 14.5 g of 90% pure 4-vinylbenzocyclobutene: bp 63°–66° C. (6 torr); $^1$H NMR (CDCl$_3$) δ3.11 (s, 4H), 5.11 (d, 1H), 5.63 (d, 1H), 6.66 (dd, 1H), 6.95 (d, 1H), 7.10 (s, 1H), 7.18 (d, 1H); $^{13}$C NMR (CDCl$_3$) δ29.29, 29.44, 112.27, 119.87, 122.52, 125.70, 136.72, 137.97, 146.66, 146.01.

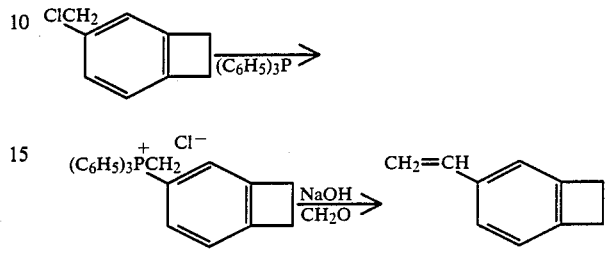

ILLUSTRATIVE EMBODIMENT III

Preparation of Styrene-Butadiene Triblock Polymers with 4-vinylbenzocyclobutene in the Styrene Block To a solution of styrene (9.73 g, 93.6 mmol), 4-vinylbenzocyclobutene 164 mg, 1.26 mmol), and 25 μl of 1-η-butoxy-2-t-butoxyethane in 233 g of cyclohexane was added 1.3 mmol of s-butyl lithium. After the mixture was heated at 50° C. for 30 min under an inert atmosphere, butadiene (25.6 g, 474 mmol) was added and the heating was continued for an additional 2.5 h. The polymerization was terminated by the addition of 0.5 mmol of methyl benzoate. GPC analysis showed the product to be a mixture of polystyrene (7.9% MW 7,500), styrene-butadiene diblock (35.4%, MW 28,000), styrene-butadiene-styrene triblock (54.4%, MW 58,000), and styrene-butadiene multiblock (2.3%, 106,000). $^1$H NMR showed the product to contain 28%W styrene, 1.2%m 4-vinylbenzocyclobutene in the styrene block, and 40%m vinyl in the butadiene block.

ILLUSTRATIVE EMBODIMENT IV

Various styrene-butadiene-styrene block copolymers with 4-vinylbenzocyclobutene (VBC) in the styrene blocks were prepared in a manner similar to that used in Illustrative Embodiment III.

Reactive styrene-butadiene-styrene block polymers containing VBC were prepared using styrene monomer containing 1.3%m of VBC. The polymerizations were carried out in glass bottles at 50° C. in cyclohexane using s-BuLi as initiator and the results are summarized in Table 1. Styrene-butadiene-styrene triblock polymers were prepared by sequential anionic polymerization of styrene and butadiene using twice the theoretical amounts of BuLi followed by coupling the living diblock polymers with methyl benzoate. GPC analysis showed the products to be mixtures of diblock and triblock polymer whose experimental molecular weights were in good agreement with those calculated based on zero consumption of BuLi by impurities. The coupling efficiencies based of methyl benzoate were generally in the range of 70–80% (Table 2).

The presence of benzocyclobutene in the products can be readily confirmed by the magnetic resonance of the ethylene protons in benzocyclobutene at δ3.1 ppm. Quantitative $^1$H NMR showed the styrene-butadiene-styrene triblock polymer to contain 1.2%m VBC based on styrene. This value agrees well with that of 1.3%m VBC in styrene monomer.

TABLE 1
Comparison of Calculated and GPC Molecular Weights

BuLi + SM + VBC ⟶ S⁻Li⁺ —BD→ SB⁻Li⁺ ⟶ SBBS

| 17317-28-# | SBBS MW (× 10³) Calculated | Found |
|---|---|---|
| 1 | 5.1–25.2–5.1 | 4.5–23.4–4.5 |
| 2 | 5.1–26.8–5.1 | 4.6–25.5–4.6 |
| 3 | 7.6–37.8–7.6 | 7.1–40.7–7.1 |
| 4 | 7.6–39.4–7.6 | 7.5–43.1–7.5 |
| 5 | 5.0–25.4–5.0 | 4.5–24.8–4.5 |
| 6 | 7.6–40.0–7.6 | 7.3–44.4–7.3 |

TABLE 2

| 17317-28-# | % SBBS Calculated | Found | Coupling Eff. (%) |
|---|---|---|---|
| 1 | 78 | 58 | 73.4 |
| 2 | 79 | 50 | 63.3 |
| 3 | 77 | 62 | 80.5 |
| 4 | 77 | 54 | 70.1 |
| 5 | 79 | 61 | 77.2 |
| 6 | 77 | 62 | 80.5 |

What is claimed is:

1. A block copolymer selected from the group consisting of AB block copolymers, ABA block copolymers, (AB)$_{\overline{m}}$Y block copolymers, (AB)$_{\overline{n}}$Y-(A)$_o$ block copolymers, (AB)$_{\overline{n}}$Y-(B)$_p$ block copolymers and mixtures thereof where each "A" is a copolymer block of a monoalkenylarene monomer and a benzocyclobutene monomer of the formula

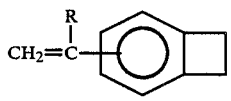

where R is H or CH$_3$, each "B" is a polymerized conjugated diene hydrocarbon block, "m", "n", "o" and "p" are each 1 to about 30 and Y is the residue of a multifunctional coupling agent or multifunctional initiator.

2. The block copolymer of claim 1 where said monoalkenyl arene monomer is styrene and said conjugated diene is selected from the group consisting of butadiene and isoprene.

3. The block copolymer of claim 1 wherein said benzocyclobutene monomer is 4-vinylbenzocyclobutene.

4. The block copolymer of claim 2 wherein the number average molecular weight of the A block(s) are 300 to 30,000 and the number average molecular weight of the B block(s) are 15,000 to 100,000.

5. The block copolymer of claim 1 wherein the A block comprises about 0.01 to about 20 mole percent benzocyclobutene monomer and about 99.99 to 80 mole percent monoalkenyl arene monomer.

6. The AB block copolymer of claim 1 containing randomly distributed pendant benzocyclobutene structures in the A block.

7. The ABA block copolymer of claim 1 containing randomly distributed pendant benzocyclobutene structures in the A blocks.

8. The (AB)$_{\overline{m}}$Y block copolymer of claim 1 containing randomly distributed pendant benzocyclobutene structures in the A block.

9. A process for preparing an AB block copolymer comprising:
(a) solution polymerizing a monoalkenyl arene monomer and a benzocyclobutene monomer of the formula

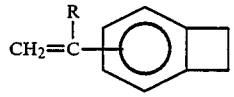

where R is H or CH$_3$ under polymerization conditions at a temperature between about −75° C. and +150° C. with a organomonolithium initiator therein forming a living polymeric arm A-Li;
(b) contacting said living polymeric arm A-Li with a conjugated diene monomer therein forming a polymeric arm AB-Li; and
(c) recovering the resulting block copolymer AB.

10. A process for preparing an ABA block copolymer comprising:
(a) solution polymerizing a monoalkenyl arene monomer and a benzocyclobutene monomer of the formula

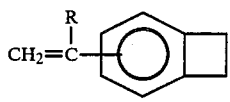

where R is H or CH$_3$ under polymerization conditions at a temperature between about −75° C. and +150° C. with an organomonolithium initiator therein forming a living polymeric arm A-Li;
(b) contacting said living polymeric arm A-Li with a conjugated diene monomer therein forming a polymeric arm AB-Li; and
(c) contacting said living polymeric arm AB-Li with additional monoalkenyl arene monomer and benzocyclobutene monomer, therein forming a polymeric arm ABALi; and
(d) recovering the resulting block copolymer ABA.

11. A process for preparing a block copolymer (AB)$_{\overline{m}}$Y comprising:
(a) solution polymerizing a monoalkenyl arene monomer and a benzocyclobutene monomer of the formula

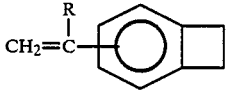

where R is H or CH$_3$ under polymerization conditions at a temperature between about −75° C. and +150° C. with an organomonolithium initiator therein forming a living polymeric arm A-Li;
(b) contacting said living polymeric arm A-Li with a conjugated diene monomer therein forming a polymeric arm AB-Li; and
(c) contacting said living polymeric arm AB-Li with a coupling agent therein forming the block copolymer (AB)$_{\overline{m}}$Y where Y is the residue of the coupling agent and "m" is between 1 and 30.

12. The process of claim 9 wherein said monoalkenyl arene monomer is styrene and said conjugated diene is selected from the group consisting of butadiene and isoprene.

13. The process of claim 9 wherein said benzocyclobutene monomer is 4-vinylbenzocyclobutene.

14. The process of claim 10 wherein said monoalkenyl arene monomer is styrene and said conjugated diene is selected from the group consisting of butadiene and isoprene.

15. The process of claim 10 wherein said benzocyclobutene monomer is 4-vinylbenzocyclobutene.

16. The process of claim 11 wherein said monoalkenyl arene monomer is styrene and said conjugated diene is selected from the group consisting of butadiene and isoprene.

17. The process of claim 11 wherein said benzocyclobutene monomer is 4-vinylbenzocyclobutene.

18. The process of claim 12 wherein said monoalkenyl arene monomer is styrene and said conjugated diene is selected from the group consisting of butadiene and isoprene.

19. The process of claim 12 wherein said benzocyclobutene monomer is 4-vinylbenzocyclobutene.

* * * * *